UNITED STATES PATENT OFFICE.

HENRY ZAHN, OF CHICAGO, ILLINOIS.

COMPOSITION FOR SOAP.

SPECIFICATION forming part of Letters Patent No. 311,555, dated February 3, 1885.

Application filed May 31, 1884. (Specimens.)

*To all whom it may concern:*

Be it known that I, HENRY ZAHN, a citizen of the United States, residing in Chicago, in the county of Cook and State of Illinois, have invented certain new and useful Improvements in Composition for Soaps; and I hereby declare the following to be a full, clear, and exact description of the same.

My invention relates to the composition of silica soaps; and it consists in a composition containing a flour-like silicious alkaline earth of a character hereinafter more fully described. The silicious alkaline earth which I employ is such as is found in the Republican River valley, and in the valley of the river Loup, in the State of Nebraska, and in various other localities. It is supposed to belong to the pliocene period, and is usually found in beds of more or less thickness exposed in many places along creeks, and has the general appearance of limestone when seen from a distance. On top is generally a deposit of loess three feet, drift three feet, and compact silicate of lime and limestone from six inches to three feet. Near these beds are found remains of geyser-tubes, and the material is a silicious alkaline earth, probably produced by geyser action. An analysis shows the material to be composed of—

| | |
|---|---|
| Silica | 67.01 |
| Water | 8.03 |
| Soda and potassa | 7.87 |
| Magnesia | 4.05 |
| Alumina | 7.11 |
| Iron | 2.81 |
| Lime | 2.01 |
| Total | 98.89 | varying somewhat in different locations and often in the same beds. The silica presents itself in the form of angular translucent scales of the finest divisibility, said scales being insoluble, except in hydrofluoric acid, and infusible except in the oxyhydrogen blow-pipe flame. The balance of the mass is composed of alkalies—such as potash, soda, lime, and magnesia—both free and in the form of carbonates.

In carrying out my invention I take out all the impurities, preferably by sifting, and when so purified this silicious earth can be used for making soaps by combining it with animal fats or vegetable oils and the usual alkalies used in soap-making.

I have found the following formulas produce excellent soaps for the purposes specified, but do not desire or intend to be limited thereto: For cleaning floors, tinware, coarse metals, or washing greasy garments, twenty-five parts saponified fat, five parts rosin, and seventy parts silicious alkaline earth. For toilet uses and washing fine garments, sixty parts saponified fat and forty parts silicious alkaline earth. For laundry soap, fifty-five parts saponified fat, ten parts rosin, and thirty - five parts silicious alkaline earth. The alkalies contained in this silicious earth I have found will not unite with the other alkalies used in soap-making, but will remain neutral, giving the soap great cleansing properties.

In mixing the silicious earth with the curd after saponification, it is found that it mixes uniformly with such curd, and remains so mixed in the frames preparatory to cutting into bars, differing from other forms of silica, which sink in the kettle and in the frame.

Among the advantages of the silicious earth hereinbefore specified as an ingredient in the composition of soaps are the neutral alkalies, the mechanical action due to the thin flaky scales, (differing from other forms of silica,) and the affinity for water, absorbing about sixty-five per cent. of its own weight.

Having thus described my invention, what I claim as new, and desire to secure by Letters Patent, is—

1. As an ingredient in the composition of soaps, the silicious alkaline earth herein specified.

2. A soap composed of the silicious alkaline earth herein described, and animal fats or vegetable oils, and a saponifying alkali, substantially as and for the purposes specified.

3. A soap composed of the silicious alkaline earth herein specified, and animal fats or vegetable oils, and a saponifying alkali, and a small quantity of rosin as a binder of the silicious scales, substantially as and for the purposes specified.

HENRY ZAHN.

Witnesses:
F. W. BRAINERD,
E. L. THURSTON.